United States Patent Office 3,549,344
Patented Dec. 22, 1970

3,549,344
METHOD OF REMOVING TIN FROM THE SURFACE OF FLAT GLASS BY DOUBLE ION EXCHANGE
David Gordon Loukes, Prescot, and Roy Smith, Rainhill, England, assignors to Pilkington Brothers Limited, Lancashire, England, a corporation of Great Britain
No Drawing. Continuation-in-part of application Ser. No. 465,749, June 21, 1965. This application June 23, 1969, Ser. No. 835,782
Claims priority, application Great Britain, June 23, 1964, 25,953/64
Int. Cl. C03c 17/22
U.S. Cl. 65—30                                                 7 Claims

ABSTRACT OF THE DISCLOSURE

A method of flat glass manufacture in which glass in ribbon form is in contact with molten tin and tin enters the surface layer of the glass, comprising first treating the surface containing the tin ions with a strong acid to substitute the tin ions with hydrogen ions and secondly treating the said surface layer with an inorganic salt of at least one element of the group consisting of lithium, calcium, zinc, silver, manganese and copper to effect an ion exchange in said layer of at least a proportion of the hydrogen ions therein for said elements.

CROSS-REFERENCES TO RELATED APPLICATIONS

This application is a continuation-in-part of our co-pending United States Patent application Ser. No. 465,-749, filed June 21, 1965 now abandoned.

BACKGROUND OF THE INVENTION

This invention relates to the treatment of flat glass which has been produced by a process during which the glass is in contact with a molten metal.

In prior Pat. No. 3,083,551, there is disclosed a method of manufacturing float glass on a bath of molten tin characterised by establishing on the bath a layer of molten glass and maintaining the glass at a temperature permitting unhindered lateral flow until there is developed on the bath a buoyant body of glass in ribbon form and thereafter cooling the glass as it is advanced on the bath to the discharge end of the bath so that it can be taken unharmed from the bath.

Experience has shown that the glass so produced absorbs tin, probably in the form of stannous oxide, into the bottom surface and, if the glass is subjected to a heat treatment in the presence of oxygen, for example in a toughening process, the tin or tin compound present in the surface of the glass undergoes a change which shows up after the toughtening process and which mars the optical properties of the glass.

The main object of the present invention is to remove tin, in the form of stannous ions, from the bottom surface of the glass taken from the bath and to replace the stannous ions so removed by ions of another element. The element whose ions are introduced into the glass surface as a replacement for the stannous ions may be an element chosen to impart some new desired characteristics to the glass, or it may be an element chosen simply because it does not undergo a change when subjected to heat treatment in an oxidising atmosphere. It is, therefore, a particular object of the present invention to remove sufficient tin, in the form of stannous ions from the bottom surface of the glass to enable the glass to be subjected to a toughening process, without detriment to the surface quality and appearance of the glass.

It is believed that the optical disabilities are due to a change in volume during the conversion of the stannous oxide dissolved in the surface of the glass to stannic oxide with the uptake of oxygen gas.

SUMMARY

In accordance with the present invention there is provided, a method of manufacturing flat glass during which at least one surface of the glass is in contact with molten tin and thereby acquires a polished finish while stannous ions enter said polished surface of the glass to form therein a surface layer rich in stannous ions, comprising treating said surface layer with hydrochloric acid to substitute a proportion of the stannous ions by hydrogen ions and treating the partially substituted surface layer with a salt of at least one element of the group consisting of lithium, calcium, zinc, silver, manganese and copper to effect an ion exchange between at least a proportion of the hydrogen ions therein and said element, thereby imparting to the glass surface a property associated with the presence of that element in the glass while preserving the polished nature of the glass surface.

Advantageously the element whose ions are used to replace at least some of the tin ions in the glass surface is an element exhibiting a valency state of two, and calcium and zinc are the preferred elements.

Thus, even though flat glass produced in accordance with the present invention has ions present in its surface, the ions which are present do not adversely affect the optical qualities of the glass when this is subjected to a heat treatment in oxygen. Accordingly the surface characteristics of the flat glass surface which has been in contact with molten tin during the manufacture of the glass are improved whilst preserving the polished nature of the glass surface.

DESCRIPTION OF THE PREFERRED EMBODIMENTS

In carrying the present invention into effect, flat glass which, during its manufacture, has been in contact with molten tin is first treated with a strong acid such as HCl and then subjected to the action of an inorganic salt (preferably calcium chloride).

The contact of the HCl with the tin-rich glass surface results in a selective reaction with a proportion of the stannous ions in the glass but no reaction with the silica matrix of the glass.

In one practical embodiment of the invention in which the flat glass is produced on a bath of molten tin, the glass taken from the bath is first treated with a 1:1 aqueous solution of hydrochloric acid at a temperature of the order of 100° C. for a period of time of 1 minute. Experiments have shown that when using the concentration just referred to a period of treatment exceeding 1 minute can result in the glass showing iridescence, i.e. interference colours. Also, if such an overtreated glass is then heated in an oxygen-containing atmosphere, a distortion of the glass surface known as "crazing" can result.

After the replacement of the tin ions the glass is subjected to treatment by a saturated solution of an inorganic salt capable of providing ions in the glass in substitution for the H ions. Thus the ions of a saturated solution of calcium chloride are used to provide calcium ions to replace the H ions in the glass.

Instead of calcium chloride, zinc chloride may be used with equal satisfaction in the herein described process of improving the glass for a subsequent thermal treatment, e.g. a heat treatment in a toughening process.

The subsequent treatment, with a saturated salt solution, of a glass surface showing iridescence as a result of over-treatment with the acid removes the iridescence and restores the glass to its original quality.

The method in accordance with the present invention may be performed in direct conjunction with the continuous manufacture of a glass ribbon by the float process, during which manufacture the glass is in contact with molten tin. The temperature at which the glass is first treated, in accordance with the example given, is near to the temperature of the glass ribbon leaving an annealing lehr, so that the substitution of the tin ions by hydrogen ions may be carried out near the exit end of the lehr. The subsequent treatment with the saturated solution of the inorganic salt is effected by applying the salt solution at a temperature of about 130° C. for a sufficient period of time, e.g. 5 minutes, after which any excess salt is removed from the surface of the glass by washing.

Alternatively the method of the present invention may be practised on sheets of flat glass cut from a ribbon of glass which was manufactured in contact with molten tin. By this method, only the sheets of glass whose surface characteristics need to be improved for a particular use are treated, and the unnecessary treatment of glass which is not to be used for a particular purpose is avoided.

The element whose ions are introduced into the glass surface in substitution for the hydrogen ions may be selected for the purpose of imparting other desired properties to the glass surface. For example the substitution of the hydrogen ions by silver ions may be performed in order to produce a glass surface which is at least partially silvered, and other elements, for example manganese or copper may be introduced to effect staining or tinting of the glass for purposes such as avoiding glare when the glass is used as a windscreen. The introduction of copper and other elements into the glass surface may also be employed for providing an electrically conducting layer on the glass surface.

When the treatment is effected in accordance with the invention to produce a coloured effect of staining or tinting of the glass, the first stage of the process involving the introduction of hydrogen ions is performed as a partial substitution of stannous ions in the glass surface. In the second stage of the process the hydrogen ions are themselves substituted by ions of the colouring element or metal, for example copper, so that there are present in the glass, side by side, ions of the colouring element and stannous ions. The colour in the glass is then developed by heating the glass to a temperature of the order of 500° C. to 650° C., when the stannous ions reduce the ions of the colouring element or metal to the elemental state, in which the colour is exhibited.

A ruby colour may be provided in the glass by introducing copper, for example by treatment with a saturated solution of cupric chloride, and yellow colours may be introduced into the glass by treating the surface with a solution of a silver salt, followed in each case by heat treatment to develop the colour in the glass.

The intermediate product obtained in accordance with the first stage of the method exemplified hereinbefore is consequently an important product which may be subsequently used to obtain a flat glass at least one surface of which has ions introduced therein for specific purposes. This intermediate product is a flat glass obtained by manufacture during which the glass is in contact with molten tin, tin ions in the surface of the glass being subsequently replaced by hydrogen ions by the method as described.

We claim:

1. A method of manufacturing flat glass during which at least one surface of the glass is in contact with molten tin and thereby acquires a polished finish while stannous ions enter said polished surface of the glass to form therein a surface layer rich in stannous ions, comprising treating said surface layer at an operative temperature up to 100° C. with hydrochloric acid for a time and at a strength sufficient to substitute a proportion of the stannous ions by hydrogen ions without etching the glass, and subsequently treating the partially substituted surface layer with a saturated solution of a chloride of at least one element selected from the group consisting of lithium, calcium, zinc, silver, manganese and copper, for a time and at an operative temperature up to 130° C., sufficient to effect an ion exchange between at least a proportion of the hydrogen ions therein and said element, thereby imparting to the glass surface a property associated with the presence of that element in the glass while preserving the polished nature of the glass surface.

2. A method of treating flat glass comprising the following sequence of steps:
 (a) contacting a surface of the glass with molten tin and thereby producing in the glass a surface layer rich in stannous ions,
 (b) treating said surface layer rich in stannous ions with hydrochloric acid at an operative temperature up to 100° C. for a time not over 1 minute and at a strength related to said temperature and time, but sufficient to effect substitution of hydrogen ions in the layer for a proportion of the stannous ions without etching the glass, and
 (c) subsequently treating the partially substituted surface layer so formed at an operative temperature up to 130° C. and for a time not over 5 minutes with a saturated solution of a chloride of at least one element selected from the group consisting of lithium, calcium, zinc, silver, manganese, and copper said time and temperature being sufficient to effect ionic exchange with at least a proportion of the hydrogen ions in the surface layer to impart to the glass surface a property associated with that element.

3. A method of manufacturing flat glass comprising advancing glass in ribbon form along a bath of molten tin, removing the ribbon from the bath with the underface of the glass ribbon constituted by a surface layer rich in stannous ions, treating said surface layer of the glass with hydrochloric acid at a temperature of about 100° C. for a time of about 1 minute to substitute a proportion of the stannous ions by hydrogen ions, and subsequently treating the partially-substituted surface layer of the glass with a saturated solution of a chloride of at least one element selected from the group consisting of lithium, calcium, zinc, silver, manganese and copper, for about 5 minutes at about 130° C. to effect an ionic exchange between at least a proportion of the hydrogen ions and said element, thereby imparting to the underface of the glass a property associated with the presence of that element in the glass while preserving the polished nature of the undersurface of the glass.

4. A method according to claim 2, including treating said partially-substituted surface layer of the glass with, and finally heating the glass to a temperature in the range from 500° C. to 650° C. to effectuate reduction of ions of said element to their elemental state by stannous ions remaining in said surface layer to develop colour in the glass.

5. A method according to claim 2, wherein the hydrochloric acid is about a 1:1 aqueous solution.

6. A method according to claim 2, wherein the chloride is calcium chloride.

7. A method according to claim 2, wherein the chloride is zinc chloride.

References Cited

UNITED STATES PATENTS

| | | | |
|---|---|---|---|
| 2,606,566 | 8/1952 | Tarnopol | 156—24 |
| 3,284,181 | 11/1966 | Harrell et al. | 65—31 |
| 3,287,201 | 11/1966 | Chisholm et al. | 65—30 |
| 3,438,760 | 4/1969 | Loukes et al. | 65—30 |

LEON BASHORE, Primary Examiner

R. L. LINDSAY, Jr., Assistant Examiner

U.S. Cl. X.R.

65—31, 65, 99; 117—124; 156—24

PO-1050
(5/69)

UNITED STATES PATENT OFFICE
CERTIFICATE OF CORRECTION

Patent No. 3,549,344        Dated December 22, 1970

Inventor(s) David G. Loukes and Roy Smith

It is certified that error appears in the above-identified patent and that said Letters Patent are hereby corrected as shown below:

Column 4, line 50, after "with" should be inserted

--cupric chloride--

Signed and sealed this 23rd day of March 1971.

(SEAL)
Attest:

EDWARD M. FLETCHER, JR.        WILLIAM E. SCHUYLER, JR.
Attesting Officer               Commissioner of Patents